(12) United States Patent
Shakespear et al.

(10) Patent No.: US 8,762,002 B2
(45) Date of Patent: Jun. 24, 2014

(54) STEERING SYSTEM FOR THREE-WHEELED VEHICLE

(75) Inventors: Daniel Shakespear, Lake Orion, MI (US); Frank Leopold, Taunusstein-Orlen (DE)

(73) Assignee: GM Global Technology Operations LLC, Detroit, MI (US)

(*) Notice: Subject to any disclaimer, the term of this patent is extended or adjusted under 35 U.S.C. 154(b) by 261 days.

(21) Appl. No.: 13/303,704

(22) Filed: Nov. 23, 2011

(65) Prior Publication Data

US 2013/0131932 A1 May 23, 2013

(51) Int. Cl.
*B62D 61/06* (2006.01)
*B62D 6/02* (2006.01)

(52) U.S. Cl.
USPC .............................. 701/41; 280/92; 280/274

(58) Field of Classification Search
USPC .......... 701/41, 49; 280/92, 62, 274, 276, 277, 280/279, 282; 180/210–217
See application file for complete search history.

(56) References Cited

U.S. PATENT DOCUMENTS

| | | | | |
|---|---|---|---|---|
| 1,074,748 | A * | 10/1913 | Satterlee | 280/92 |
| 1,623,726 | A * | 4/1927 | Herds | 280/92 |
| 3,539,196 | A * | 11/1970 | Fleming | 280/92 |
| 4,313,514 | A * | 2/1982 | Furukawa et al. | 180/446 |
| 4,353,567 | A * | 10/1982 | Weldy | 280/92 |
| 4,703,824 | A * | 11/1987 | Irimajiri et al. | 180/215 |
| 5,277,268 | A * | 1/1994 | Kuwayama et al. | 180/216 |
| 5,927,424 | A * | 7/1999 | Van Den Brink et al. | 180/216 |
| 6,328,125 | B1 * | 12/2001 | Van Den Brink et al. | 180/211 |
| 6,435,522 | B1 * | 8/2002 | Van Den Brink et al. | 280/5.509 |
| 7,059,619 | B2 * | 6/2006 | Dom | 280/276 |
| 7,887,077 | B2 * | 2/2011 | Thiers | 280/276 |

FOREIGN PATENT DOCUMENTS

| | | | | |
|---|---|---|---|---|
| BE | 1010650 A3 * | 11/1998 | | B60G 3/18 |
| FR | 2551015 A1 * | 3/1985 | | B62D 1/24 |
| GB | 284118 | * 1/1928 | | B62K 25/24 |

OTHER PUBLICATIONS

Foale, Tony, "Motorcycle Handling and Chassis Design: the art and science", Second Edition, Tony Foale Designs, Mar. 2006, Chapter 7 (Front Suspension), pp. 7-31 to 7-34.*
OEC 1930 Duplex Steering diagram, retrieved from the web, 4 pages total (1 page diagram, with 3 page Internet Archive record), Internet Archive Date May 16, 2008, retrieved from http://cybermotorcycle.com/gallery/oec/OEC_1930_Duplex_Steering.htm.*
EPO machine translation of FR 2551015 (original FR document published Mar. 1, 1985).*

\* cited by examiner

*Primary Examiner* — Behrang Badii
*Assistant Examiner* — David Testardi
(74) *Attorney, Agent, or Firm* — Quinn Law Group, PLLC

(57) ABSTRACT

A vehicle includes a frame, first and second wheels that are selectively rotatable about a first horizontal axis, a third wheel, and a steering system. The steering system operatively connects the third wheel to the frame such that the third wheel is selectively rotatable about a second horizontal axis. The steering system is configured to selectively toe the third wheel and to laterally displace the third wheel with respect to the frame, thereby increasing stability during turning.

6 Claims, 4 Drawing Sheets

US 8,762,002 B2

STEERING SYSTEM FOR THREE-WHEELED VEHICLE

TECHNICAL FIELD

The invention relates to steering systems for three-wheeled vehicles.

BACKGROUND OF THE INVENTION

Most passenger vehicles include four ground-engaging wheels, namely two rear wheels and two front wheels. However, some vehicle configurations include only three ground-engaging wheels. In one three-wheeled vehicle configuration, known as a "Delta" configuration, the vehicle has two rear wheels and a single front wheel. In another three-wheeled vehicle configuration, known as a "tadpole" configuration, the vehicle has two front wheels and a single rear wheel.

SUMMARY OF THE INVENTION

A vehicle includes a frame, a wheel, and a steering system. The steering system operatively connects the wheel to the frame, and is configured to selectively toe the wheel and to laterally displace the wheel with respect to the frame. Thus, during turning of the vehicle, the wheel moves laterally with respect to the center of gravity, thereby improving vehicle stability.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
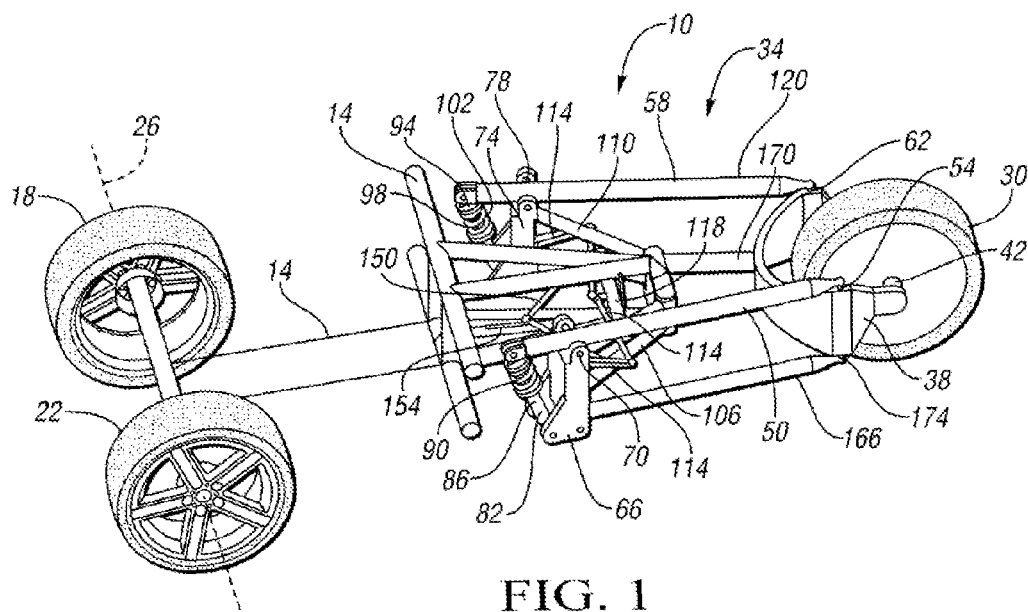
FIG. 1 is a schematic, perspective view of a three-wheeled vehicle having a wheel controlled by a steering system.
Figure 2:
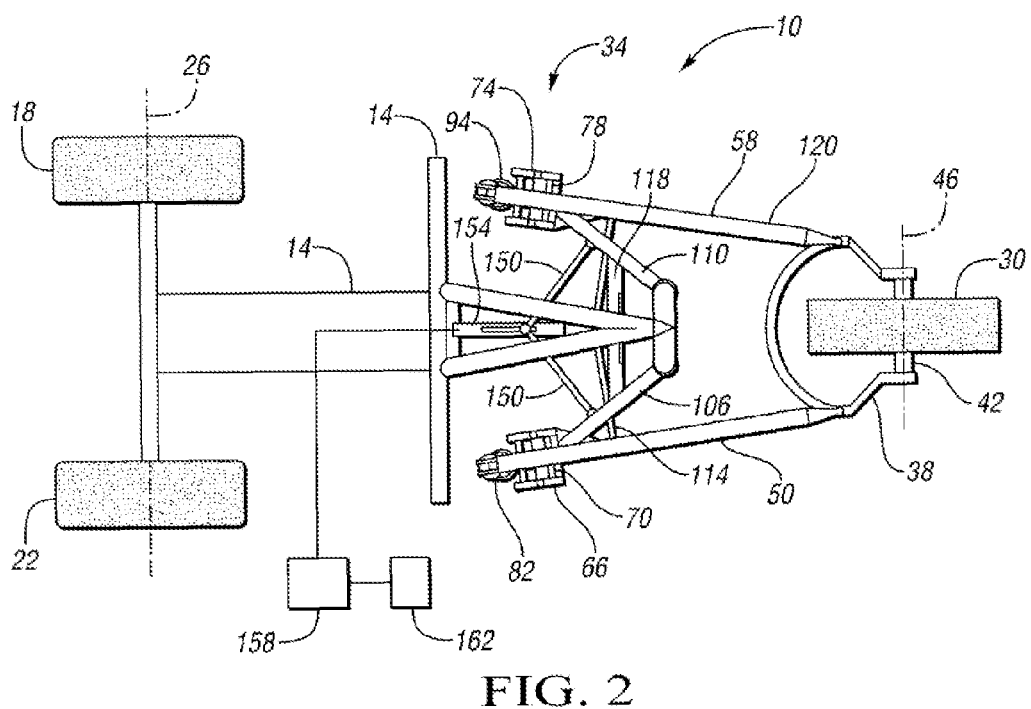
FIG. 2 is a schematic, top view of the three-wheeled vehicle of FIG. 1 with the steering system in a first configuration and the wheel in a first position.

Referring to FIGS. 1 and 2, a three-wheeled vehicle 10 includes a vehicle frame 14. The frame 14 is shown schematically. In one embodiment, the frame 14 may be integrated with the vehicle body (not shown). In another embodiment, the frame 14 may be a separate unit to which the body of the vehicle is attached. The vehicle 10 also includes two ground-engaging wheels 18, 22 that are rotatably mounted with respect to the frame 14 for rotation about a common horizontal axis 26. The vehicle 10 includes a another ground-engaging wheel 30 that is longitudinally spaced from the other wheels 18, 22. The wheel 30 is mounted with respect to the frame 14 by a suspension and steering system 34. In the embodiment depicted, the vehicle 10 includes no other ground-engaging wheels except for wheels 18, 22, 30.

The system 34 includes a first member 38, which, in the embodiment depicted, is C-shaped. The first member 38 supports the wheel 30 on an axle 42 so that the wheel 30 is selectively rotatable about a generally horizontal axis (shown at 46 in FIG. 2). A second member 50 is pivotably connected to the first member 38 via a ball joint 54. A third member 58 is pivotably connected to the first member 38 via another ball joint 62.

The second member 50 is operatively connected to a fourth member 66, which, in the embodiment depicted, is a bracket. More specifically, the second member 50 is operatively connected to the fourth member 66 via a pivot pin 70 such that the second member 50 is selectively pivotable with respect to the fourth member 66 about a horizontal axis. The third member 58 is operatively connected to a fifth member 74, which, in the embodiment depicted, is a bracket. More specifically, the third member 58 is operatively connected to the fifth member 74 via a pivot pin 78 such that the third member 58 is selectively pivotable with respect to the fifth member 74 about a horizontal axis.

A first strut assembly 82 operatively connects one end of the second member 50 to the fourth member 66. More specifically, one end of the first strut assembly 82 is rotatably connected to the second member 50, and the other end of the first strut assembly 82 is rotatably connected to the fourth member 66. The first strut assembly 82 includes a shock absorber 86 and a spring 90. Similarly, a second strut assembly 94 operatively connects one end of the third member 58 to the fifth member 74. More specifically, one end of the second strut assembly 94 is rotatably connected to the third member 58, and the other end of the second strut assembly 94 is rotatably connected to the fifth member 74. The second strut assembly 94 includes a shock absorber 98 and a spring 102.

The wheel 30 is thus operatively connected to the first and second strut assemblies 82, 94 to transmit vertical motion of the wheel 30 caused by road irregularities to the first and second strut assemblies 82, 94. More specifically, vertical motion of the wheel 30 is transmitted to the second member 50 via the first member 38; the second member 50 pivots about pivot pin 70 and transmits motion to the shock absorber 86 and spring 90. Similarly, vertical motion of the wheel 30 is transmitted to the third member 58 via the first member 38; the third member 58 pivots about pivot pin 78 and transmits motion to the shock absorber 98 and spring 102.

The fourth and fifth members 66, 74 are movably mounted with respect to the frame 14 via support members 106, 110. More specifically, support members 106, 110 are connected to the frame 14; the fourth member 66 is pivotably connected to support member 106 and the fifth member 74 is pivotably connected to support member 110. Thus, the fourth and fifth members 66, 74 are selectively pivotable with respect to the support members 106, 110 and the frame 14. A mechanical linkage 114 operatively interconnects the fourth and fifth members 66, 74 to a steering gear 118. The steering gear 118 is operatively connected to a steering wheel (not shown) or other user-operable input device to control the system 34. Movement of the steering gear 118 causes the fourth and fifth members 66, 74, and, corresponding, the second and third members 50, 58, to pivot about vertical axes with respect to the support members 106, 110 and the frame 14.

The first, second, third, fourth, and fifth members 38, 50, 58, 66, 74 cooperate to define a mechanism, namely a four-bar linkage 120 that causes the wheel 30 to move laterally (transversely) with respect to the frame 14 and to toe in response to input from the steering gear 118. As used herein, toeing refers to rotation of the wheel 30 about a vertical axis to enable the vehicle 10 to turn. The four-bar linkage 120 is configured to receive an input motion and to transform the input motion into an output motion that includes both toe of the wheel 30 and lateral displacement of the wheel 30.

More specifically, in FIGS. 1 and 2, the wheel 30 is shown in a first position relative to the frame 14. In the first position, the wheel 30 is at the center of the transverse dimension of the vehicle (along the longitudinal centerline), and the steering angle of the wheel 30 is at zero degrees. The wheel 30 is shown in a second position in FIG. 3, in which the wheel has been rotated approximately twenty-two degrees on a vertical axis and has been laterally moved.

Figure 3:
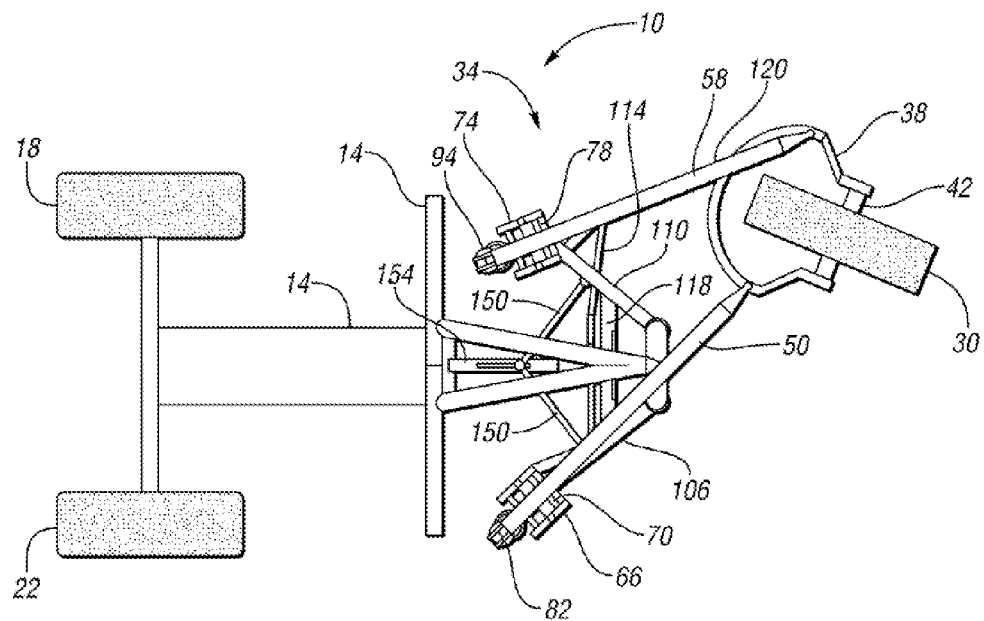
FIG. 3 is a schematic, top view of the three-wheeled vehicle of FIG. 1 with the steering system in a first configuration and the wheel in a second position.

Referring to FIG. 3, wherein like reference numbers refer to like components from FIGS. 1 and 2, movement of the steering gear 118 causes the fourth and fifth members 66, 74, and correspondingly, the second and third members 50, 58, to pivot with respect to the support members 106, 110 and the frame 14. As the second and third members 50, 58 pivot, they move the first member 38 and the wheel 30 laterally with respect to the frame 14. Simultaneously, the second and third members 50, 58 cause the first member 38 and the wheel 30 to rotate, or toe. Accordingly, the four-bar linkage 120 receives an input force and motion from the steering gear 118 and transforms the input force and motion into output force and motion that laterally moves the wheel 30 and that toes the wheel 30.

Figure 4:
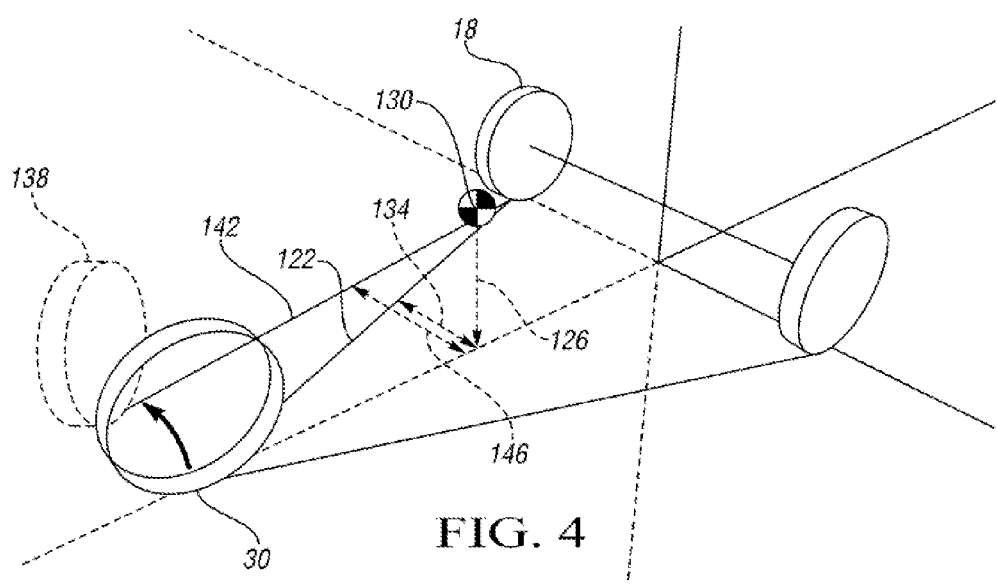
FIG. 4 is a schematic depiction of the wheel of FIGS. 1-3 in the first and second positions relative to the vehicle's center of gravity.

Referring to FIG. 4, the wheel 30 is shown in its first position at 30. A line 122 interconnects rear wheel 18 and front wheel 30. The stability of the vehicle 10 subject to a lateral load, such as cornering, is a function of the height 126 of the vehicle's center of gravity 130 divided by the horizontal distance 134 from the center of gravity 130 to the line 122 that interconnects wheels 18, 30. When the wheel 30 is in the second position (shown in phantom at 138), the line interconnecting the wheels is moved to the position shown at 142. The distance from the center of gravity 130 to the line at 142 is shown at 146. Distance 146 is greater than distance 134, and thus moving the wheel laterally to its second position during a turn increases vehicle stability compared to merely toeing the wheel in its first position.

Referring again to FIGS. 1-3, the system 34 is configured such that there is a relationship between the amount of lateral movement of the wheel 30 and the amount of toe, or rotation, of the wheel 30. That is, the steering system 34 is configured such that the amount of toe of the wheel 30 is a function of the amount of lateral movement of the wheel 30. The system 34 is configured such that the relationship between lateral displacement and toe of the wheel is selectively variable.

In the embodiment depicted, the four-bar linkage 120 is selectively reconfigurable such that the relative amounts of toe and lateral displacement in the output motion are selectively variable. More specifically, members of the four-bar linkage 120 are selectively movable to change the dynamic response of the four-bar linkage 120 and thereby provide variable relationships between lateral movement and toe of the wheel 30. When the four-bar linkage 120 is in a first configuration, as shown in FIGS. 2 and 3, the lateral displacement and toe of the wheel are characterized by a first relationship such that four hundred millimeters of lateral displacement of the wheel results in twenty-two degrees of toe.

The support members 106, 110 are mounted with respect to the frame 14 such that they are selectively pivotable about vertical axes. A linkage 150 operatively connects the support members 106, 110 to an actuator 154, which is operative to selectively rotate or pivot the support members 106, 110. The support members 106, 110 are mounted with respect to the fourth and fifth members 66, 74, and, accordingly, when the support members 106, 110 pivot, the fourth and fifth members 66, 74 also move, which in turn causes the second and third members 50, 58 to rotate about pivot pins 62 and 78, thereby altering the geometry of the four-bar linkage 120 and changing the output motion of the system 34.

Figure 5:
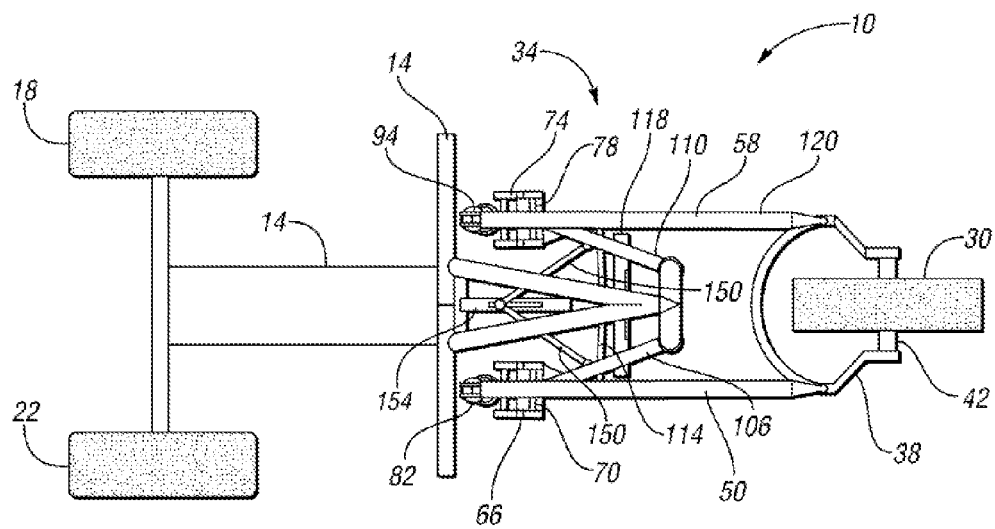
FIG. 5 is a schematic, top view of the three-wheeled vehicle of FIG. 1 with the steering system in a second configuration and the wheel in the first position.

Referring to FIG. 5, wherein like reference numbers refer to like components from FIGS. 1-4, the four-bar linkage 120 is shown in a second configuration in which the actuator 154 has caused the fourth and fifth members 66, 74 to move inboard and toward one another, thereby rendering the second and third members 50, 58 nearly parallel to one another, whereas the distance between the second and third members 50, 58 decreases with proximity to the wheel 30 when the four-bar linkage 120 is in the first configuration. In the second configuration, the relative amounts of toe and lateral displacement in the output motion are different from the relative amounts of toe and lateral displacement in the first configuration.

Figure 6:
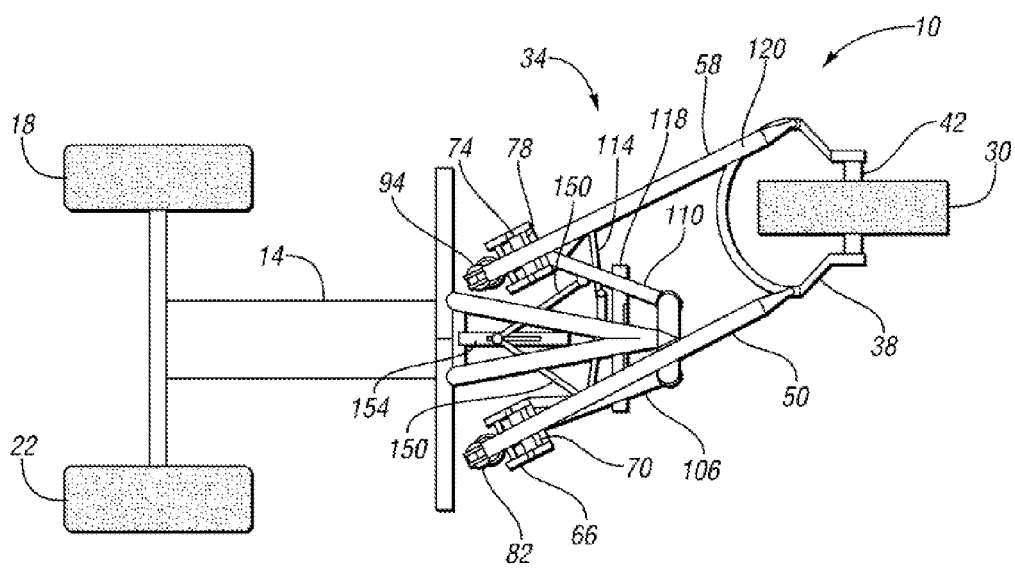
FIG. 6 is a schematic, top view of the three-wheeled vehicle of FIG. 1 with the steering system in the second configuration and the wheel in a third position.

More specifically, when the four-bar linkage 120 is in the second configuration, the four-bar linkage 120 responds to the input motion from the steering gear 118 by moving the wheel 30 to a third position as shown in FIG. 6. Referring to FIG. 6, when the wheel 30 is in the third position, the wheel 30 is characterized by the same amount of lateral displacement (four hundred millimeters) as when the wheel 30 is in the second position shown in FIG. 3. However, the wheel 30 has been toed only 1.5 degrees. Accordingly, the amount of toe for any given amount of lateral displacement is less when the four-bar linkage 120 is in the second configuration than when the four-bar linkage 120 is in the first configuration. Thus, the actuator 154 is configured to selectively reconfigure the linkage 120 such that the relative amounts of toe and lateral displacement in the output motion are selectively variable.

The first configuration of the four-bar linkage 120 is particularly useful at low vehicle speeds so that a small turning radius is achieved. The second configuration is particularly useful at higher speeds. As shown in FIG. 2, the vehicle 10 includes a controller 158 that is operatively connected to the actuator 154 and that is configured to selectively cause the actuator 154 to reconfigure the four-bar linkage 120 by moving the support members 106, 110. A sensor 162 is configured to measure the speed of the vehicle 10 and operatively connected to the controller 158 to communicate the measured speed of the vehicle 10 to the controller 158. The controller 158 is configured to cause the actuator 154 to reconfigure the four-bar linkage 120 based on the speed of the vehicle. The controller acts to make the second and third members 50, 58 more parallel to reduce the amount of toe relative to the amount of lateral displacement with increasing speed of the vehicle 10.

Referring again to FIG. 1, in the embodiment depicted, the system 34 includes a sixth member 166 and a seventh member 170. The sixth member 166 is pivotably connected to the first member 38 via a ball joint 174. The seventh member 170 is pivotably connected to the first member 38 via a ball joint (not shown). The sixth member 166 is also pivotably connected to the fourth member 66; accordingly, the movement of the sixth member 166 is substantially the same as the movement of the second member 50. The seventh member 170 is also pivotably connected to the fifth member 74; accordingly, the movement of the seventh member 170 is substantially the same as the movement of the third member 58.

Figure 7:
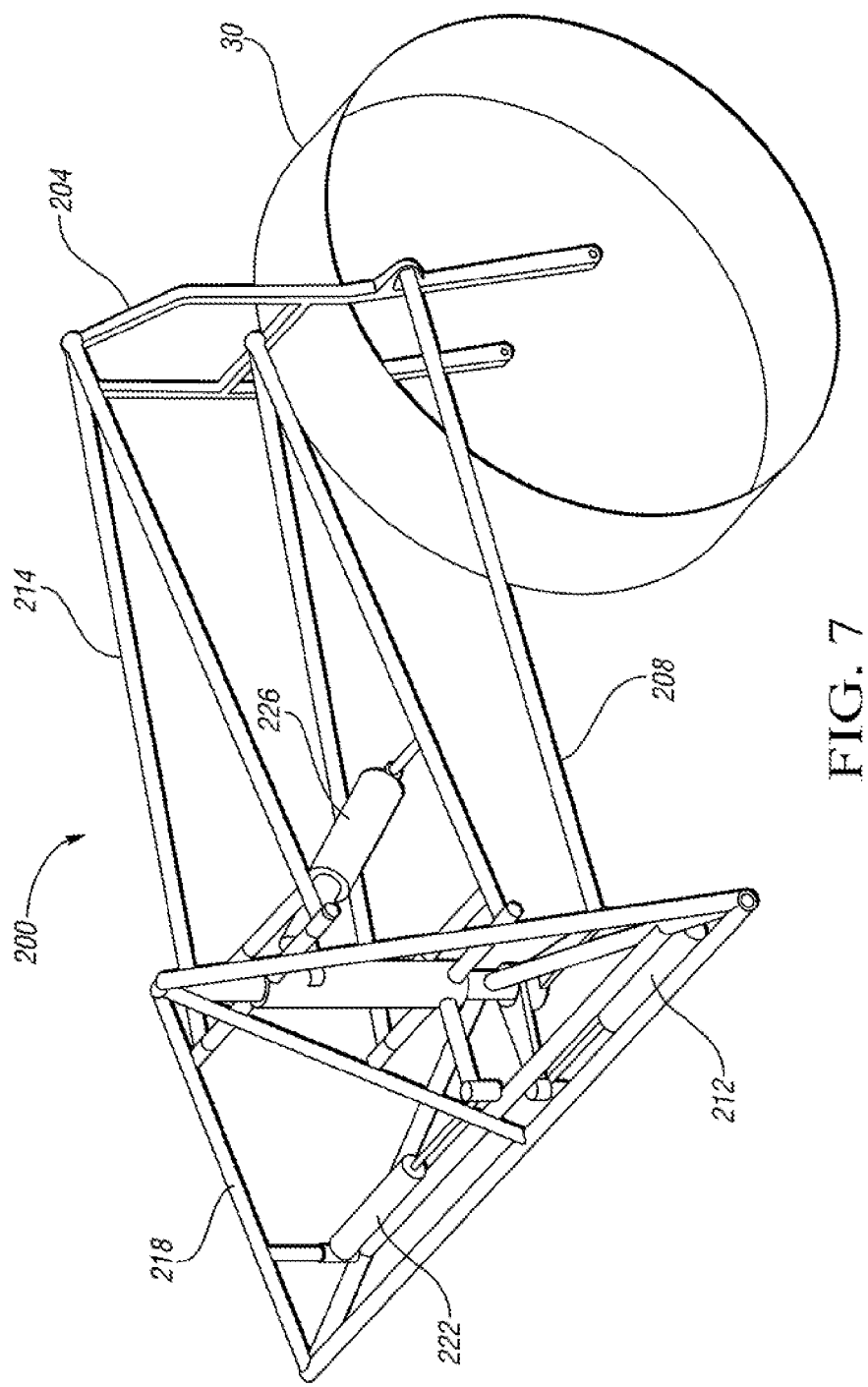
FIG. 7 is a schematic, perspective view of an alternative steering system for use with the vehicle of FIG. 1.

Referring to FIG. 7, an alternative suspension and steering system 200 that may be used in the vehicle 10 of FIG. 1 is schematically depicted. The system 200 includes a member 204 that rotatably supports the wheel 30. A first link 208 is pivotably connected to the member 204 such that fore/aft movement of the first link 208 causes the member 204 to rotate about a vertical axis, which in turn causes the wheel 30 to toe. The system 200 includes a first actuator 212 that is operatively connected to the link 208 to cause fore/aft movement of the link 208, and thereby cause the wheel 30 to toe.

A support structure 214 operatively connects member 204 to the frame 218. A second actuator 222 is operatively connected to the wheel 30 via the support structure. The actuator is configured to laterally move the wheel 30 by causing the rotation of the support structure 214. Accordingly, the system 200 is configured such that toe and lateral displacement of the wheel 30 is independently controllable by a respective actuator 212, 222. A strut assembly 226 operatively interconnects the support structure 214 and the frame 218, and is configured to damp vertical movement of the wheel 30.

While the best modes for carrying out the invention have been described in detail, those familiar with the art to which this invention relates will recognize various alternative designs and embodiments for practicing the invention within the scope of the appended claims.

The invention claimed is:

1. A vehicle comprising:
   a frame;
   a wheel;
   a steering system that operatively connects the wheel to the frame, and that is configured to selectively toe the wheel and to laterally displace the wheel with respect to the frame, the steering system including a mechanism configured to receive an input motion and to transform the input motion into an output motion that includes both toe of the wheel and lateral displacement of the wheel;
   an actuator configured to selectively reconfigure the mechanism such that the relative amounts of toe and lateral displacement in the output motion are selectively variable;
   a controller operatively connected to the actuator and configured to selectively cause the actuator to reconfigure the mechanism;
   a sensor configured to measure the speed of the vehicle and operatively connected to the controller to communicate the measured speed of the vehicle to the controller;
   wherein the controller is configured to cause the actuator to reconfigure the mechanism based on the speed of the vehicle; and
   wherein the controller is configured to cause the reconfiguration of the mechanism such that the amount of toe decreases relative to the amount of lateral displacement with increasing speed of the vehicle.

2. The vehicle of claim 1, wherein the mechanism is a linkage having variable geometry.

3. The vehicle of claim 2, wherein the linkage includes a first member, a second member, a third member, a fourth member, and a fifth member;
   wherein the wheel is operatively connected to the first member such that the wheel is selectively rotatable with respect to the first member about a horizontal axis;
   wherein the second member is operatively connected to, and selectively pivotable with respect to, the first member and the fourth member;
   wherein the third member is operatively connected to, and selectively pivotable with respect to, the first member and the fifth member; and
   wherein the fourth and fifth members are selectively movable with respect to the first member to vary the angle formed between the second and third members.

4. A vehicle comprising:
   a frame;
   first and second wheels that are selectively rotatable about a first horizontal axis;
   a third wheel; and
   a steering system that operatively connects the third wheel to the frame such that the third wheel is selectively rotatable about a second horizontal axis, the steering system including a mechanism configured to receive an input motion and to transform the input motion into an output motion that includes both toe of the third wheel and lateral displacement of the third wheel; and
   an actuator;
   wherein the steering system is configured to selectively toe the third wheel and to laterally displace the third wheel with respect to the frame;
   wherein the mechanism includes a first member, a second member, a third member, a fourth member, and a fifth member;
   wherein the third wheel is operatively connected to the first member such that the third wheel is selectively rotatable with respect to the first member about a horizontal axis;
   wherein the second member is operatively connected to, and selectively pivotable with respect to, the first member and the fourth member;
   wherein the third member is operatively connected to, and selectively pivotable with respect to, the first member and the fifth member;
   wherein the fourth and fifth members are selectively movable such that the distance between the fourth and fifth members is selectively variable; and
   wherein the actuator is configured to selectively move the fourth and fifth member to vary the distance between the fourth and fifth members.

5. The vehicle of claim 4, further comprising a controller operatively connected to the actuator and configured to selectively cause the actuator to vary the distance between the fourth and fifth members; and
   a sensor configured to measure the speed of the vehicle and operatively connected to the controller to communicate the measured speed of the vehicle to the controller;
   wherein the controller is configured to cause the actuator to vary the distance between the fourth and fifth members based on the speed of the vehicle.

6. The vehicle of claim 5, wherein the controller is configured to cause the actuator to vary the distance between the fourth and fifth members such that the amount of toe decreases relative to the amount of lateral displacement with increasing speed of the vehicle.

\* \* \* \* \*